July 7, 1970     A. H. STOCK     3,518,949
APPARATUS FOR CONDITIONING DOUGH AND BAKED GOODS
Filed Feb. 19, 1968     3 Sheets-Sheet 1

INVENTOR
ARNOLD H. STOCK

BY Wheeler, Wheeler, House & Clemency
ATTORNEYS

July 7, 1970  A. H. STOCK  3,518,949
APPARATUS FOR CONDITIONING DOUGH AND BAKED GOODS
Filed Feb. 19, 1968  3 Sheets-Sheet 2
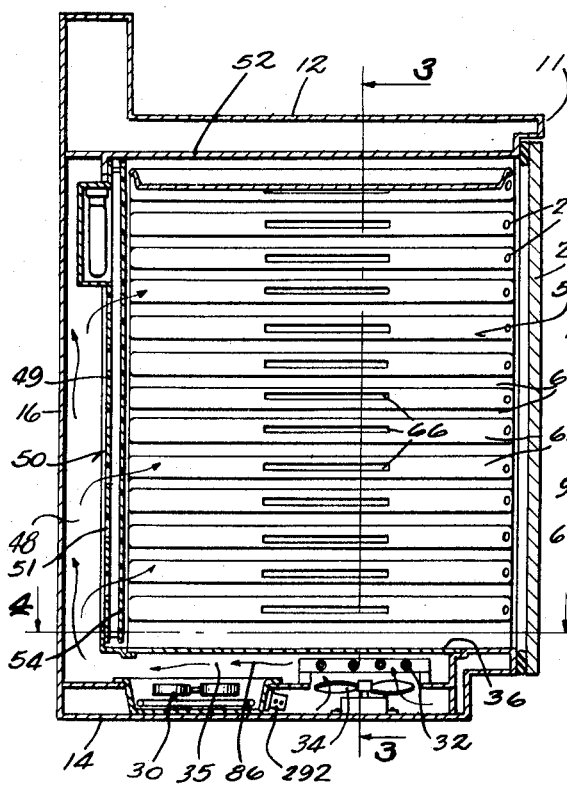
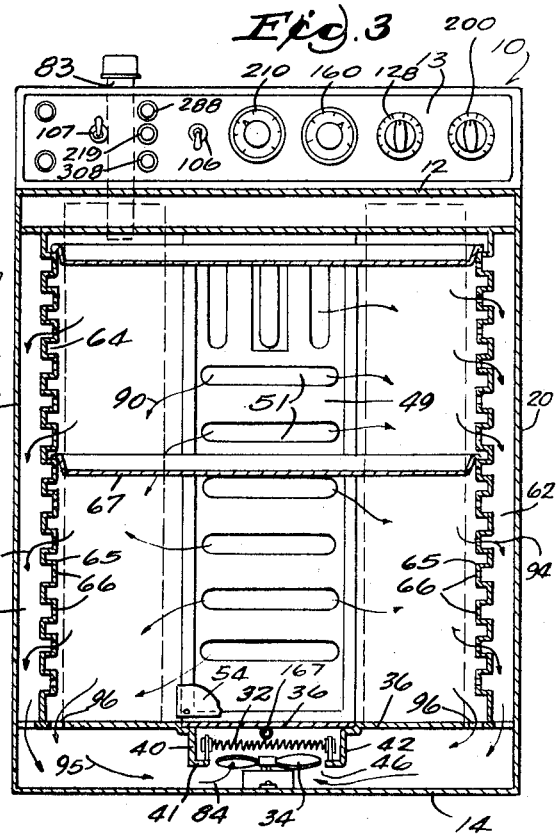
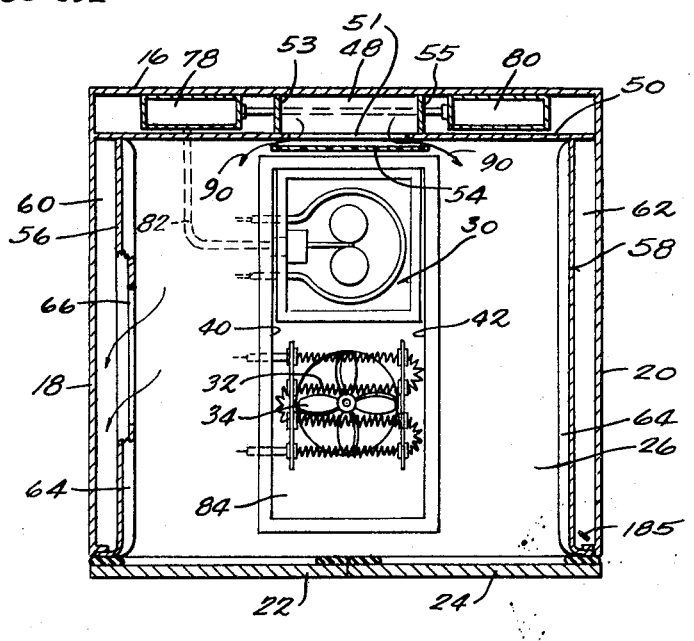
INVENTOR
ARNOLD H. STOCK
BY Wheeler, Wheeler, House & Clemency
ATTORNEYS

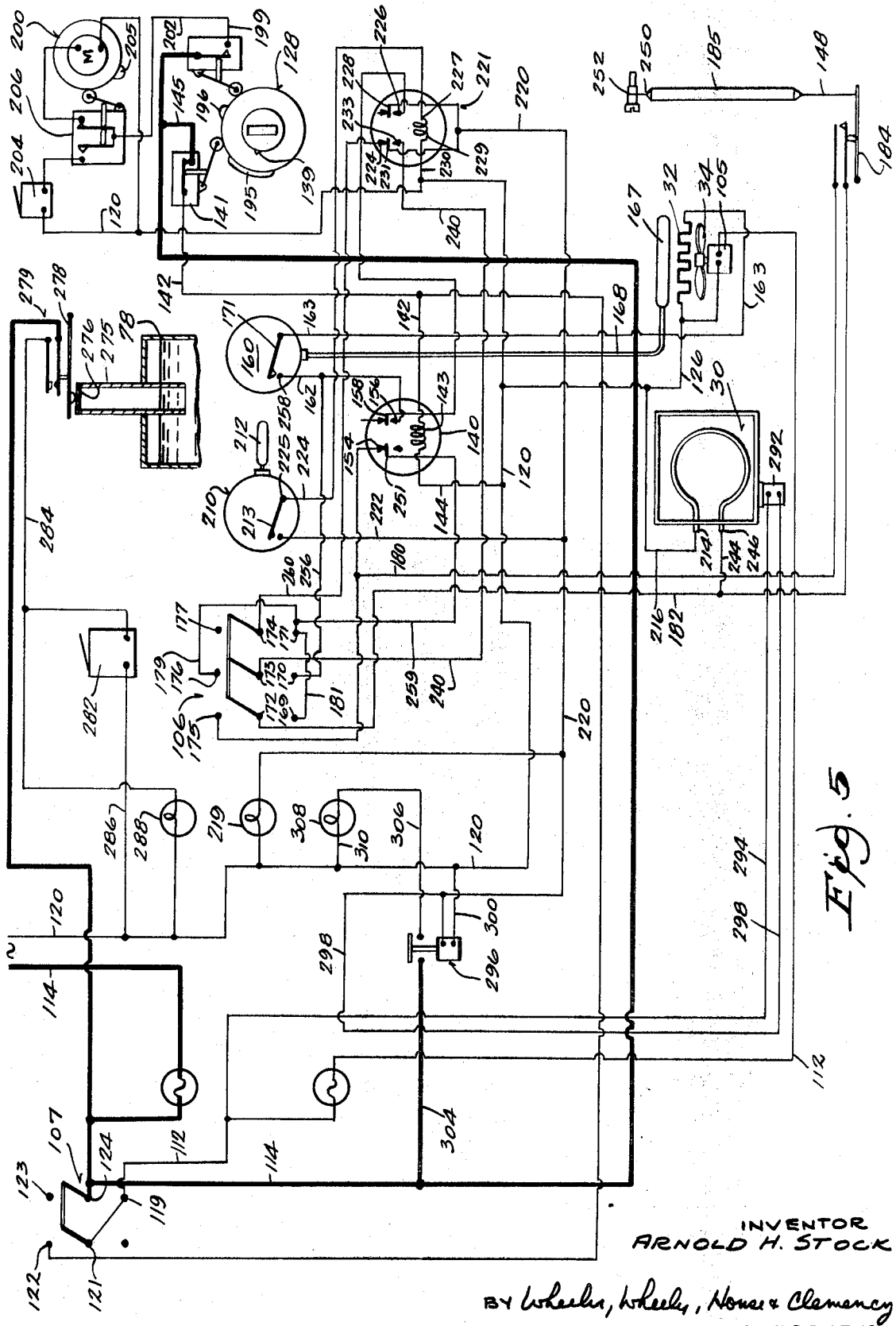

United States Patent Office 3,518,949
Patented July 7, 1970

3,518,949
APPARATUS FOR CONDITIONING DOUGH AND BAKED GOODS
Arnold H. Stock, Rte. 1, Newton, Wis. 53063
Filed Feb. 19, 1968, Ser. No. 706,548
Int. Cl. A21c 13/00
U.S. Cl. 107—7                                         8 Claims

ABSTRACT OF THE DISCLOSURE

Disclosed herein is a method and apparatus for defrosting and proofing dough and holding baked goods at serving temperature for extended periods. The apparatus includes a cabinet containing a water vapor generator, a heater and a fan for circulating heated air and water vapor through the cabinet. A circuit containing first and second temperature controls and a humidity responsive switch is operatively connected to the heater and water vapor generator to maintain the temperature and humidity levels at predetermined values during the use of the cabinet for the various processes. The circuit also includes timers to maintain the preselected temperature and humidity conditions for preselected periods.

BACKGROUND OF INVENTION

Figure 1:
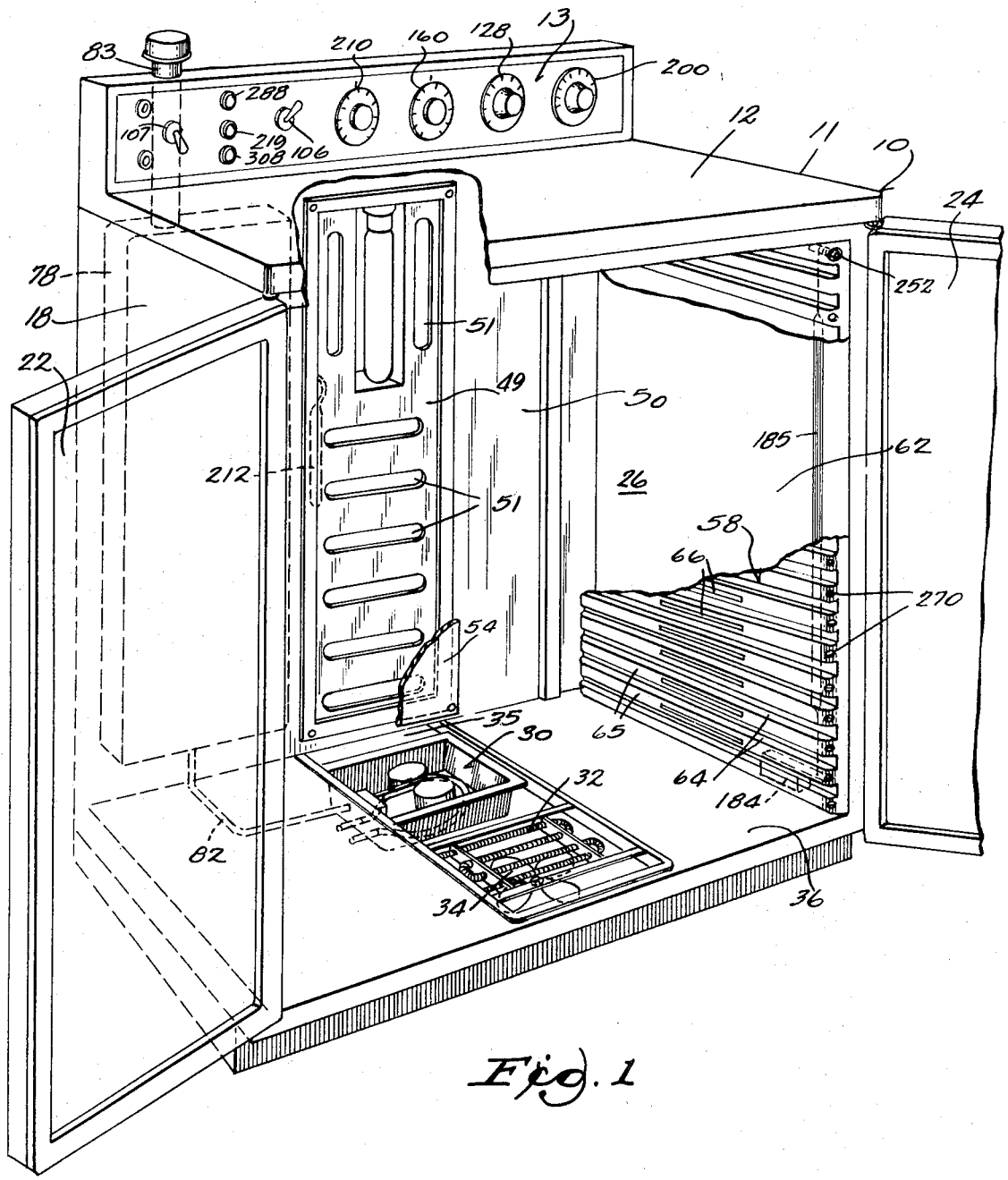

The invention relates to methods and apparatus for conditioning frozen dough and baked goods.

SUMMARY OF INVENTION

The invention provides an apparatus for maintaining an environment within an enclosure at predetermined temperature and humidity levels for defrosting frozen dough, for proofing dough preliminary to baking and for storing baked goods at serving temperatures for extended periods. The apparatus includes a cabinet containing a heater, a fan and a water vapor generator which are located in an air flow passage beneath a sub-floor at the bottom of the enclosure. The cabinet contains other flow passages to afford continual circulation of air through the cabinet interior to maintain the temperature and humidity at the preselected levels. A circuit is provided which includes timers, two temperature controls and a humidity responsive switch for maintaining the desired temperature and humidity conditions.

To defrost and proof frozen dough in accordance with the method of the invention, a first timer is energized to maintain the predetermined temperature conditions for a selected period for the first cycle. Upon expiration of the defrosting period, the circuit energizes the water vapor generator for the proofing cycle which maintains the temperature at a preselected value of approximately 100 degrees and a humidity level of approximately 85 percent. The water vapor generator is controlled by a first temperature control during the proofing cycle. Upon expiration of the proofing cycle a second timer energizes an alarm buzzer.

The invention also provides a method of maintaining the freshness of baked goods held at serving temperatures for extended periods. The method comprises maintaining the holding environment at a controlled temperature of 120 degrees to 145 degrees at a controlled humidity level of 20 percent to 50 percent. During the holding operation both the first and second temperature controls and the humidity responsive switch are operatively connected to the circuit. Upon drop in the humidity below a preset level the humidity responsive switch will energize the water vapor generator and supply the necessary water vapor to bring the humidity up to the selected value. The first temperature control is adjusted to maintain the temperature at a value between 120 degrees and 150 degrees. Upon drop in the interior temperature below the preselected value, the first temperature control will energize the heater. The second temperature control is responsive to increases in temperature adjacent the heating element and will limit the temperature of the heating element to a preselected value of about 225 degrees.

Further objects and advantages of the present invention will become apparent from the following disclosure.

DRAWINGS

FIG. 1 is a perspective view of the apparatus of the invention.
FIG. 2 is a side elevational view partially broken away of the apparatus shown in FIG. 1.
FIG. 3 is a sectional view along line 3—3 of FIG. 2.
FIG. 4 is a sectional view along line 4—4 of FIG. 2.
FIG. 5 is a schematic diagram of the electrical circuit.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a bakery conditioner or apparatus for defrosting and proofing dough and holding baked goods which is generally designated 10 and which includes a cabinet 11 having a top wall 12, a control panel 13, a bottom wall 14, a rear wall 16 and two opposed parallel side walls 18 and 20 which together with front doors 22 and 24 define an enclosure or cabinet with an interior 26. The apparatus also includes a water vapor generator 30, a heater or heating element 32, and a motor driven fan 34.

The bakery conditioner 10 is provided with flow passages for conveying and dispersing water vapor and heated air into the cabinet interior 26 and recirculating air from the interior 26 to the fan 34 and the heater 32 to maintain the temperature at a controlled level. In this regard, means are provided defining a first flow pasage 35 comprising a sub-floor or partition 36 which, as shown in FIGS. 2 and 3, is spaced vertically above the floor 14. The means defining the first flow passage 35 also includes two spaced partitions 40 and 42 which depend from partition 36. The water vapor generator 30, the heater 32 and the fan 34 are located in the passage 35 formed between the partitions. The lower edges 41 of the partitions 40 and 42 are spaced above the floor 14 to provide an inlet path 46 to supply air to the fan 34.

Means are provided defining a second flow passage 48 at the rear of the cabinet 11 in the form of a rear wall partition 50 which is spaced forwardly of the rear wall 16 and has its lower edge connected to the sub-floor 36 and the upper edge connected to a top partition 52. The front of the passage 48 is enclosed by a removable panel 49 with louvers 51 which is received within and secured to the rear wall partition 50. A plastic sheet 54 is mounted on the rear wall partition 50 and spaced forwardly of the louvered panel 49 by approximately one-half inch to deflect the air coming from the louvers laterally along the sides of the rear wall partition. The means also includes spaced vertical partitions 53 and 55 connecting the rear wall 16 and the rear wall partition 50. The second flow passage 48 communicates with the first flow passage 35 at the lower end of passage 48 and the rear of the passage 35.

Means are provided defining third and fourth flow passages 60 and 62 for returning air from the interior 26 to the fan 34. The passages 60 and 62 are formed by side wall partitions 56 and 58 which are spaced interiorly of the side walls 16 and 18. In the disclosed construction, the side wall partitions 56 and 58 are constructed of vacuum molded plastic and are provided with a plurality of horizontal channels 64 between spaced ribs 65 (FIGS. 1, 2, 3) which are adapted to receive and support trays 67 containing baked goods. The ribs 65 contained elongated slots 66 which serve as inlet openings for the passages 60 and 62 as hereinafter described.

Water is supplied to the water vapor generator 30 by water storage tanks 78 and 80 respectively located between the partitions 53 and 55 and the side walls 18 and 20. The water tank 78 is provided with a water fill tube 83 with a removable cap (FIG. 3).

In operation of the bakery conditioner as thus far described, when the fan 34 and the heating element 32 are energized by a circuit hereinafter described, the air is drawn toward the fan 34 in the direction indicated by arrows 84 (FIGS. 3, 4) and is directed by the fan through the first flow passage 35 as shown by arrows 86 (FIG. 2), into the second flow passage 48. The air will be discharged into the cabinet interior 26 through louvers 51 in the panel 49 and around the edges of the sheet 54 as shown by arrows 90 (FIG. 3). The air will be withdrawn from the interior after circulation around the trays 67 by the suction created by the fan 34. The air in the interior 26 returns to the fan through the slots 66 and the passages 60, 62 and travels downwardly through passages 60 and 62 as shown by arrows 93 and 94 and returns to the fan as shown by arrows 95 through apertures or slots 96 in the sub-floor partition 36.

Referring to FIG. 5, there is disclosed a circuit which controls the heater 32 and the water vapor generator 30 to perform the processes of defrosting and proofing dough and holding baked goods in accordance with the invention. The circuit includes a triple post double throw switch 106 and a double post double throw switch 107 which adapts the circuit to perform these processes.

During operation of the bakery conditioning apparatus for the defrost, proofing and holding operations, the fan is continually energized by a lead 120 which is connected to line voltage or 115 volts 60 cycle AC and to the fan by a lead 126. The circuit to the fan is completed by a lead 112 which is connected to terminal 119 on the double post double throw switch 107.

The circuit is operative to energize the heater for a first cycle or first selected time interval for defrosting frozen dough. During the defrosting process the double post double throw switch 107 is thrown so that the terminal 121 is in contact with the terminal 122 and the terminal 124 is in contact with the terminal 123. The circuit includes means for maintaining the temperature and humidity within the cabinet interior at first predetermined temperature and humidity conditions for the first cycle. In this regard, the circuit includes a defrost timer 128 which desirably has a time period of at least two hours and a relay 140. When the defrost timer 128 is set to the position shown by the indicator arrow 139, the switch 141 in the timer 128 is closed and current is supplied to the coil 143 of the relay 140 by lead 142 connected to the switch 141. The other terminal of coil 143 is connected to lead 120 and line current by a lead 144. The switch 141 is connected to line current by a lead 145 which is connected to lead 114.

To maintain the temperature at the first selected level during the defrost cycle, a first adjustable temperature control 160 is provided. When the timer 128 is adjusted to perform the defrost cycle and the relay 140 is energized, terminals 156 and 158 in the relay 140 make contact and connect the temperature control 160 into the circuit for controlling the temperature of the heater 32 by a lead 162. The other terminal of the temperature control 160 is connected to the heater 32 by a lead 163. The temperature control 160 is connected to a bulb 167 which is located above the heater 32 by a conduit 168 which can be filled with an expansible fluid which will expand with increase in temperature and actuate a switch 171 within temperature control 160. The other side of the heater 32 is connected to line current by lead 126 which is connected to lead 120. Upon drop in temperature below the preselected level, the drop will be sensed by the bulb 167 to actuate the switch 171 and energize the heater 32.

When the defrosting process is being performed, the triple post double throw switch 106 is positioned so that the terminal 172 makes contact with the terminal 175, terminal 173 makes contact with terminal 176 and terminal 174 makes contact with terminal 177. A jumper 179 connects terminal 176 with 171. A jumper 181 connects terminals 169 and 171. When the switch 106 is in this position, the leads 180 and 182 which are connected to a micro-switch 184 which forms part of a humidity control together with a nylon ribbon 185 are shorted thus removing the micro-switch 184 from the circuit. The micro-switch 184 and the nylon ribbon 185 control relative humidity in the interior 26 during the holding process as hereinafter described. During the defrosting process the fan circulates the air within the interior 26 to reduce the humidity.

Upon expiration of the defrosting period the circuit is operative to maintain the temperature and humidity at a second temperature and humidity level for the proofing process. When the cam 195 in the timer 128 opens the switch 141, the relay 140 is de-energized, thus opening the heater circuit. The cam 196 closes the switch 199 which energizes the motor of the proofing timer 200 through lead 202. The other terminal of the timer 200 is connected to lead 120 which is connected to the line voltage. The proofing timer 200 can be preset for the second selected period prior to commencement of the defrosting process or cycle. Upon expiration of the proofing period the timer 200 energizes the signal buzzer 204 as cam 205 closes switch 206.

During the proofing cycle or process the double post double throw switch 107 and the triple post double throw switch 106 remain in the same positions as for the defrosting sequence.

To maintain the temperature and humidity at the second preselected values, a temperature control 210 is provided with a temperature sensing bulb 212 located within the passage 48. In this regard, the terminal 214 of the water vapor generator 30 is connected to the lead 120 by a lead 216 which is connected to lead 126. Upon a drop in temperature within the air passage 48 below the preset level of temperature control 210, a switch 213 in temperature control 210 closes. Line voltage is supplied to the switch 213 through lead 218 which is connected to the lead 120 through a signal light 219 and to a lead 220. The lead 220 is connected to a lead 222 that runs to switch 213. When contact is made through switch 213 between lead 222 and lead 224, the relay 221 is energized by lead 224 which is connected to the terminal 227 of the relay 221. Terminal 227 is connected to the relay coil. The other side of the coil is connected to terminal 229 of the relay 221. The terminal 229 is connected to the lead 120 and line voltage by lead 230. When the relay is energized, contact 231 makes contact with contact 233 of the relay 221. The contact 233 is connected to the switch 106 by lead 240 which is connected to the terminal 173 which in turn is connected to the terminal 176 in the switch 106. The terminal 175 is connected to the terminal 172, and the terminal 172 is connected to terminal 246 of the water vapor generator 30 by leads 182 and 244.

During the proofing operation, the temperature control 210 is preset to maintain a temperature of approximately 100 degrees in the interior 26. The water vapor generator 30 will supply both the required heat and the necessary humidity for raising the dough which will approach 85 percent. When the proofing timer 200 actuates the signal buzzer 204, the raised dough can be removed and placed in an oven for baking.

The apparatus is also adapted to practice the method of holding baked goods at serving temperature for extended periods at temperature and humidity conditions which will maintain the freshness of the baked goods. During the holding process, the double post double throw switch 107 is positioned to make contact with the terminals 121 and 118 and terminal 124 and 119. The triple post double throw switch 106 is positioned to make contact between the terminal 172 and 169, terminals 173 and 170 and terminals 174 and 171. The temperature control 160 is then set for approximately 225 degrees. The temperature control 210 is preset for the selected holding temperature as hereinafter described.

Control of the humidity within the interior 26 is provided by the nylon ribbon 185 which is supported between upper and lower strands 248 and 250. The strand 248 is connected to the micro-switch 184 and strand 250 is wound on a rod or bolt 252 which can be rotated to adjust the tension on the ribbon 185 and the micro-switch 184 to maintain the humidity in the interior 26 at the preselected value.

During the holding process when the temperature bulb 212 for temperature control 210 senses a drop in temperature and closes the switch 213 in the temperature control 210, the relay 221 will be energized thus closing contacts 226 and 228 and contacts 231 and 233 and providing a current flow through lead 240 to terminal 173 on switch 106, from terminal 173 to terminal 170 and from terminal 170 to temperature control 160 through lead 256 which is connected to terminal 258 of temperature control 160. The switch 171 in temperature control 160 is normally closed and connects lead 256 to lead 163 which runs to one end of the heater 32. When the temperature in the cabinet interior 26 attains the preselected level, the connection between the lead 222 and the lead 224 will be opened and the relay 221 will be de-energized, thus disconnecting the heater from the circuit.

When the relative humidity within the cabinet falls below the predetermined level, as for instance 40 percent, the length of the ribbon 185 will decrease and actuate the micro-switch 184. The micro-switch 184 will energize the water vapor generator 30 by connecting the lead 244 to the line current through the lead 182 through the micro-switch 184 through the lead 180 to terminal 154 of relay 140. Terminal 154 is connected to the terminal 251. The terminal 251 is connected to the terminal 171 on the switch 106 by a lead 259. Terminal 171 is connected to terminal 224 on the relay 221 by a lead 260. The terminal 224 is connected to terminal 231 which is connected to line voltage by the lead 220. When the humidity reaches the predetermined level, the micro-switch opens and disconnects the water vapor generator 30 from the circuit. The side wall partition 58 is provided with a series of apertures 270 (FIG. 1) near the ribbon 185 to insure air flow from the interior 26 around the ribbon 185.

The invention also includes a fluid level indicating system for determining when the water tanks 78 and 80 are filled. As shown in FIG. 5, a water tank 80 is provided with a tube 275 which projects through the top of the water tank 80 and which communicates with the interior of the water tank. The top of the tube 275 is provided with a flexible diaphragm 276 which is in engagement with a member 278 of a micro-switch 279. As the tank 80 is filled and the air pressure increases in the tube 275, the diaphragm 276 expands slightly upward and closes switch 279. Switch 279 is connected to a buzzer 282 by a lead 284. The other side of the buzzer 282 is connected to line current by a lead 286 which is connected to lead 120. A signal or indicator light 288 can be provided. When the air pressure above the fluid level 290 in water tank 80 decreases to the ambient pressure, the diaphragm 276 will return to its normal position, open the switch 279 and disconnect the buzzer 282 and signal light 288 from the circuit.

The circuit also can include signal means for sensing empty water tanks. In the disclosed construction the means are in the form of a temperature responsive switch 292 which is in contact with the pan of the water vapor generator 30. As the tanks 78 and 80 empty, the absence of water will cause an increase in temperature in the water vapor generator and close the switch 292. The switch 292 is connected to line current by a lead 294 which is connected to lead 112. The switch is also connected to a relay 296 by a lead 298. The relay 296 is connected to line current by a lead 300 which is connected to lead 120. When the switch 292 closes, it energizes the relay 296 which connects lead 304 to lead 306 which in turn is connected to a signal light 308. The other terminal of the signal light 308 is connected to line current by a lead 310 which is connected to lead 120.

In operation of the apparatus of the invention for defrosting frozen dough, the temperature within the interior is desirably maintained at between 65 degrees and 80 degrees with 75 degrees providing the best results. Accordingly, the temperature control 210 is preset at a value such that the temperature in the interior 26 will be at approximately this level. Inasmuch as the temperature control bulb 212 is located in the passage 48, the temperature in the interior 26 will be somewhat less than the temperature in the passage 48. The frozen dough will tend to reduce the temperature below the preset level. When the temperature in the passage 48 drops below the preset level, the drop will be sensed by bulb 212 and the heater 32 will be energized to bring the interior temperature up to the desired value.

The proofing cycle commences upon expiration of the defrosting cycle and as cam 195 of timer 128 opens switch 141. The humidity control provided by cooperation of the nylon ribbon 185 and the micro-switch 184 is not operative or connected to the circuit during the proofing process since such controls are not reliable at the high humidity conditions present during the proofing cycle. During the proofing process, the humidity level is controlled solely by the temperature control 210 which can be preset to maintain the temperature in the interior at approximately 100 degrees. The water vapor generator 30 will provide sufficient water vapor to maintain the humidity at the desired level of approximately 85 percent. Thus, both the temperature and humidity are maintained during the proofing cycle by the use of a temperature control rather than with the temperature control and the humidity responsive switch as during the holding process. The timer 200 can be preset for the desired proofing interval, and as cam 205 closes switch 206, the buzzer 204 will be energized to signal the expiration of the proofing cycle.

The circuit becomes operative for the holding cycle when the switch 107 is positioned to make contact of the terminals 121 and 118 and terminals 124 and 119. The switch 106 is positioned to make contact between the terminals 172 and 169, the terminals 173 and 170 and the terminals 174 and 171. The temperature control 160 is then preset for a temperature of approximately 225 degrees. The temperature control 210 is preset to maintain a temperature within the interior of approximately 140 degrees. Inasmuch as the method of holding baked goods at serving temperatures in accordance with the invention maintains the freshness of the baked goods for extended periods, timers are not utilized when the circuit is operative for the holding process. It has been found that the best results for maintaining the freshness of baked goods are achieved with a temperature level within the interior of 140 degrees and a humidity level of approximately 40 percent. However, some of the advantages of the invention can be achieved with interior temperatures of between 120 degrees and 150 degrees and with relative humidity levels of 20 percent to 50 percent.

The holding process can be utilized with either baked goods or frozen baked goods. When used with the latter, the defrosting cycle is not necessary as the temperature and humidity conditions will be adequate to initially defrost the frozen baked goods and then raise the temperature of the baked goods to a serving temperature.

I claim:

1. Apparatus for defrosting and proofing dough and holding baked goods at serving temperature comprising an enclosure having an interior, means defining a first flow passage at the bottom of said enclosure, a water vapor generator located within said first flow passage, a heater located within said first flow passage, a fan located within said first flow passage, maens defining a second flow passage within said enclosure and along the rear of said enclosure, said second flow passage being in communication with said first flow passage, means defining third and fourth spaced flow passages within said enclosure, said third and fourth flow passages being in communication with said interior and with said first flow passage and whereby air directed by said fan travels through said first passage into said second passage from said second passage into said interior and from said interior to said third and fourth passages and through said third and fourth passages to said first passage.

2. The apparatus of claim 1 wherein said third and fourth flow passages are defined by side walls on said enclosure, side wall partitions spaced forwardly of said side walls, said side wall partitions having a plurality of elongated slots for receiving air from the interior of said enclosure, said side wall partitions having a plurality of horizontal channels between spaced ribs, said channels adapted to receive the ends of trays.

3. The apparatus of claim 1 including a first circuit connected to said heater and said fan for energizing said heater and said fan to maintain the interior of said enclosure at a selected first temperature and a selected first relative humidity for a selected time interval for defrosting frozen dough, a second circuit connected to said water vapor generator for energizing and de-energizing said water vapor generator to maintain the interior of said enclosure at a second selected temperature and a second humidity condition for a second predetermined time interval for proofing dough, said second circuit being operative upon the expiration of said first time interval, and a third circuit connected to said water vapor generator and said heater to maintain the interior of said enclosure at a third selected temperature and a third selected relative humidity for holding baked goods at a serving temperature for an extended period.

4. The apparatus of claim 1 wherein said enclosure has a floor and wherein said first flow passage is defined by a sub-floor spaced above a main floor, and two spaced horizontally extending partitions depending from said sub-floor, said partitions having their lower edges spaced above said floor to provide an air inlet for said first flow passage.

5. The apparatus of claim 4 wherein said second flow passage is defined by a rear wall, a rear wall partition spaced forwardly of said rear wall and connected to said sub-floor, spaced vertical partitions interconnecting said rear wall and said rear wall partitions, a removable panel secured to said rear wall partition, said panel spanning the distance between said spaced vertical partitions, slots in said panel and a screen connected to said rear panel partition and spaced forwardly of said slots to deflect air flow from said slots laterally along said rear wall partition.

6. The apparatus of claim 4 including two interconnected water tanks for supplying water to said water vapor generator, one of said water tanks having a water fill tube and the other of said water tanks containing a tube at the top of said other tank, a flexible diaphragm over the top of said tube and an electrical switch having a switch member in contact with said diaphragm, signal means, a circuit connecting said switch and said signal means, whereby during filling of said tanks air flows into said tube and expands said diaphragm to actuate said switch and energize said signal means.

7. Apparatus for defrosting and proofing dough, and holding baked goods at serving temperatures comprising an enclosure having an interior, a heater located in said interior, a fan located in said interior, a water vapor generator located in said interior, first temperature control means, second temperature control means, humidity sensing means, a circuit connected to said heater, said fan, said water vapor generator, said first and second temperature controls and said humidity sensing means, and wherein said circuit is operative to energize said heater for a first selected time interval for defrosting frozen dough and wherein said first temperature control maintains said enclosure interior at a predetermined temperature during the first selected time interval, and wherein said circuit is operative to de-energize said heater upon expiration of said time interval and to provide temperature and humidity conditions within said enclosure for proofing dough during a second selected time interval, and wherein during said second time interval said second temperature control is operative to energize and de-energize said water vapor generator to maintain the temperature and humidity in said interior at predetermined levels, said circuit being further operative to energize said heater and said water vapor generator to provide heat and humidity to maintain the freshness of baked goods at serving temperatures for an extended period and wherein during said extended period said first temperature control is operative to maintain the temperature of said heater at a predetermined temperature and said second temperature control is operative to maintain the temperature in the interior below a predetermined temperature, and wherein said humidity sensing means is operative to maintain the humidity within said interior at a predetermined value.

8. Apparatus for defrosting and proofing dough, and holding baked goods at serving temperatures comprising an enclosure having an interior, a heater located in said interior, a fan located in said interior, a water vapor generator located in said interior, first circuit means connected to said heater and said fan for energizing said heater and said fan to maintain the interior of said enclosure at a selected first temperature and a selected first relative humidity for a selected time interval for defrosting frozen dough, second circuit means connected to said water vapor generator for energizing and de-energizing said water vapor generator to maintain the interior of said enclosure at a second selected temperature and a second humidity condition for a second predetermined time interval for proofing dough, said second circuit being operative upon the expiration of said first time interval, and third circuit means connected to said water vapor generator and said heater to maintain the interior of said enclosure at a third selected temperature and a third selected relative humidity for holding baked goods at a serving temperature for an extended period.

References Cited

UNITED STATES PATENTS

| | | | |
|---|---|---|---|
| 1,555,321 | 9/1925 | Woodson | 107—7.6 |
| 1,858,086 | 5/1932 | House | 107—7.6 |
| 2,464,573 | 3/1949 | Helm | 107—7.6 XR |
| 2,499,525 | 3/1950 | Person | 219—362 |
| 3,292,560 | 12/1966 | Morabito | 107—7.6 |

LAVERNE D. GEIGER, Primary Examiner

R. I. SMITH, Assistant Examiner

U.S. Cl. X.R.

99—234